United States Patent Office  
2,956,980  
Patented Oct. 18, 1960

2,956,980

COMPOSITION CONTAINING VINYL HALIDE RESIN AND CHLOROSULFONATED POLYETHYLENE

Onni L. Law, Akron, Ohio, assignor to The Goodyear Tire & Rubber Company, Akron, Ohio, a corporation of Ohio No Drawing. Filed June 29, 1955, Ser. No. 518,925

7 Claims. (Cl. 260—45.5)

This invention relates to a thermoplastic and rigid vinyl halide resin compound having a high resistance to fracture when subjected to a severe shock.

Vinyl halide resins, particularly polyvinyl chloride, have many desirable properties including resistance to abrasion, hardness, tensile strength, and chemical inertness. Polyvinyl chloride does not have the desirable property of impact strength or, in other words, resistance to fracture when subjected to a severe blow.

The object of this invention, therefore, is to improve the impact strength of polyvinyl chloride considerably above one foot pound per inch of notch as determined by the Charpy Impact Test, without sacrificing the many other desirable properties, particularly stiffness and high heat distortion point, possessed by polyvinyl chloride.

It has now been discovered that the object of this invention is obtained when chlorosulfonated polyethylene rubber is blended with the vinyl halide resin, and particularly when blended in amounts from about 8 parts to about 16 parts per 100 parts of resin. In addition to producing a vinyl halide resin stock having high impact strength, the stock also unexpectedly possesses improved plasticity when used as a hot melt, having, for example, lower Olsen flow values at 1500 pounds p.s.i. at 180° C., improved toughness and increased translucency in milled sheet form.

The plastic resin composition of this invention comprises a blend or mixture of a vinyl halide resin and a small amount of chlorosulfonated polyethylene rubber. The vinyl halide resins as a class are found to be improved in regard to these properties, particularly impact strength. Examples of vinyl halide resins so improved include polyvinyl chloride, the copolymers of vinyl chloride with vinylidene chloride, with diethyl maleate, with vinyl acetate, and with diethyl acrylate in which the vinyl chloride monomer is used in amount from about 80 to 95% by weight based on the total weight of monomers present. Specific copolymers representative of the vinyl halide resin that may be used include the copolymer resulting from the emulsion polymerization of 95 parts of vinyl chloride and 5 parts of diethyl maleate; the copolymer resulting from the emulsion polymerization of 95 parts of vinyl chloride and 5 parts of vinyl acetate; the copolymer resulting from the emulsion polymerization of 95 parts of vinyl chloride and 5 parts of vinylidene chloride; the copolymer resulting from the emulsion polymerization of 90 parts of vinyl chloride and 10 parts of ethyl acrylate; and the copolymer resulting from the emulsion polymerization of 80 parts of vinyl chloride and 20 parts of dibutyl maleate. The vinyl halide resins may be made in accordance with disclosure found in U.S. Patents 2,381,388; 2,434,231; 2,491,444; and 2,624,718.

The rubbery chlorosulfonated polyethylene component of this invention is commercially known by the trade name "Hypalon S–2." Its manufacture is disclosed in U.S. Patent 2,212,786 to McQueen and in U.S. Patent 2,586,363 to McAlevy. It is made by chlorosulfonating normally solid ethylene polymers or interpolymers. The typical commercial material contains about 28% chlorine and 1.5% sulfur. This material is vulcanizable usually with the aid of metal oxides, accelerators, and organic acids.

The vinyl halide resin blends of this invention may be prepared in any suitable manner using common mixing equipment, including roll mills or internal mixers. Control of temperatures in the processing of the elastomer and the resinous materials is important in order to properly flux and disperse the components of the blend. A practical procedure involves first fluxing the vinyl resin together with a heat stabilizer on the rolls of a mill at a temperature ranging from about 300° F. to about 375° F., followed by the addition of the elastomer. After the resin and elastomer components are homogeneously dispersed and thoroughly fluxed, fillers, plasticizers, vulcanization agents when desired, coloring agents, lubricant, and other compounding ingredients, if required, are then added and homogeneously blended into the mixture.

The following formulation is typical for making the blend of the present invention, all parts being by weight:

Polyvinyl chloride _____ 100 parts.  
Heat stabilizer (tin mercaptide) _____ 2 parts.  
Chlorosulfonated polyethylene (Hypalon S–2) _____ As indicated below.  
Lubricant (stearic acid) _____ .25 part.

Specifically, 100 parts of the polyvinyl chloride and two parts of stabilizer were added to a two-roll mill at 350° F. and homogeneously mixed and banded into a continuous sheet to which was then added the chlorosulfonated polyethylene rubber, and milling continued until the components were homogeneously blended into a continuous band. The other ingredients were then added until homogeneously blended.

A sheet was calendered from the resulting stock at 345° F., a tape was extruded at 340° F., and a test piece was injection molded at 350° F. Physical test specimens were molded on a platen press at 350° F. under 1500 p.s.i. pressure for 15 minutes from blends made in accordance with the formulation set forth above and containing chlorosulfonated polyethylene rubber in amounts as indicated below. The following physical properties were measured on these specimens:

| Examples | 1 | 2 | 3 | 4 | 5 | 6 | 7 | 8 | 9 |
|---|---|---|---|---|---|---|---|---|---|
| Parts of chlorosulfonated polyethylene | 0 | 1 | 3 | 5 | 10 | 13 | 15 | 20 | 25 |
| Softening temperature, ° C. | 73.5 | 75 | 76 | 75 | 73 | 75 | 73.5 | 74 | 72 |
| Olsen flow in seconds measured at 1500 p.s.i. at 180° C. for 1½" flow | 102 | 102 | 82 | 54 | 17 | 15 | 12 | 6 | 3 |
| Charpy Impact Strength, p.s.i. per inch of notch | .5 | .5 | .5 | .5 | 21 | 22 | 20 | 2.5 | 1.9 |
| Hardness-Durometer "D" 77° F. | 84 | 85 | 83 | 81 | 78 | 78 | 78 | 74 | 73 |

The composition of Example 1 having an impact strength of less than 1 is easily fractured and is not useful in applications requiring resistance to fracture even though the composition has many other desirable features. The addition of chlorosulfonated polyethylene rubber to the vinyl halide resin immediately improves the resistance of the resin to fracture. A maximum resistance is developed when 13 to 15 parts of the rubber is used. A preferred amount of rubber to be blended with the resin is from about 8 parts to about 16 parts per 100 parts of resin. When up to about 25 parts of the rubber is used, the resulting composition is tough in the sense that it can be bent sharply without being fractured while still retaining its other desirable properties of rigidity and softening temperature. When more than about 25 parts of the rubber component is used, the composition becomes much more resilient.

The blends of this invention are useful in making plastic pipe, football helmets, shoulder pads, golf club heads, trays, bobbins, electrical terminal blocks, radio cabinets, luggage, phonograph records, and many other applications where resistance to shock and toughness are required.

While certain representative embodiments and details have been shown for the purpose of illustrating the invention, it will be apparent to those skilled in this art that various changes and modificaions may be made therein without departing from the spirit or scope of the invention.

What is claimed is:

1. An impact resistant and thermoplastic composition comprising a vinyl halide resin in which at least 80% by weight of vinyl halide monomer is used, based on the total weight of monomers used in making the resin and a vulcanizable chlorosulfonated polyethylene rubbery polymer present in amount sufficient to impart to the composition a Charpy impact strength in pounds per square inch per inch of notch of at least 100% more than possessed by the vinyl halide resin alone, and having a minimum Olsen flow in seconds measured at 1500 pounds per square inch at 180° C. for 1½″ flow of about 12.

2. An impact resistant and thermoplastic composition comprising a vinyl halide resin in which at least 80% by weight of vinyl halide monomer is used, based on the total weight of monomers used in making the resin and from about 8 to about 16 parts of chlorosulfonated polyethylene per 100 parts of resin, the chlorosulfonated polyethylene being vulcanizable to a rubbery polymer.

3. An impact resistant and thermoplastic composition comprising a vinyl chloride resin in which at least 80% by weight of vinyl chloride monomer is used based on the total weight of monomers used in making the resin and from about 8 to about 16 parts of chlorosulfonated polyethylene per 100 parts of resin, the chlorosulfonated polyethylene being vulcanizable to a rubbery polymer.

4. An impact resistant and thermoplastic composition comprising 90 parts of a vinyl chloride resin in which at least 80% by weight of vinyl chloride monomer is used, based on the total weight of monomers used in making the resin and 10 parts of chlorosulfonated polyethylene, the chlorosulfonated polyethylene being vulcanizable to a rubbery polymer.

5. An impact resistant and thermoplastic composition comprising polyvinyl chloride and from about 8 to about 16 parts of chlorosulfonated polyethylene per 100 parts of resin, the chlorosulfonated polyethylene containing about 28% chlorine and about 1.5% sulfur.

6. A mixture comprising polyvinyl chloride and from 2 to 20% by weight of chlorosulfonated polyethylene.

7. An impact resistant composition comprising a vinyl halide resin in which at least 80% by weight of vinyl halide monomer is used, based on the total weight of monomers used in making the resin, and a chlorosulfonated polyethylene.

References Cited in the file of this patent

UNITED STATES PATENTS

| | | |
|---|---|---|
| 2,586,363 | McAlevy | Feb. 19, 1952 |
| 2,693,459 | Fisk | Nov. 2, 1954 |